United States Patent
Veldten et al.

(10) Patent No.: US 10,316,770 B2
(45) Date of Patent: Jun. 11, 2019

(54) METHOD FOR DIAGNOSING AN EXHAUST GAS CATALYTIC CONVERTER, AND MOTOR VEHICLE

(71) Applicant: Volkswagen AG, Wolfsburg (DE)

(72) Inventors: Burkhard Veldten, Wolfsburg (DE); Maciej Kulaszewski, Braunschweig (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 174 days.

(21) Appl. No.: 15/102,356

(22) PCT Filed: Dec. 29, 2014

(86) PCT No.: PCT/EP2014/079390
§ 371 (c)(1),
(2) Date: Jun. 7, 2016

(87) PCT Pub. No.: WO2015/110247
PCT Pub. Date: Jul. 30, 2015

(65) Prior Publication Data
US 2016/0312719 A1    Oct. 27, 2016

(30) Foreign Application Priority Data
Jan. 21, 2014  (DE) .................. 10 2014 201 000

(51) Int. Cl.
*F01N 3/00*   (2006.01)
*F02D 41/00*  (2006.01)
(Continued)

(52) U.S. Cl.
CPC ......... *F02D 41/0055* (2013.01); *F01N 3/208* (2013.01); *F01N 11/00* (2013.01);
(Continued)

(58) Field of Classification Search
CPC . F01N 2560/026; F02D 41/123; F02D 41/055
See application file for complete search history.

(56) References Cited

U.S. PATENT DOCUMENTS

2004/0098980 A1  5/2004  Montreuil et al.
2005/0016266 A1  1/2005  Rabl
(Continued)

FOREIGN PATENT DOCUMENTS

CN  101839161 A   9/2010
CN  103201484 A   7/2013
(Continued)

OTHER PUBLICATIONS

Office Action for Chinese Patent Application No. 201480073797.6, dated Jan. 2, 2018.
(Continued)

*Primary Examiner* — Mark Laurenzi
*Assistant Examiner* — Jason Sheppard
(74) *Attorney, Agent, or Firm* — Pearl Cohen Zedek Latzer Baratz LLP

(57) ABSTRACT

The invention relates to a method and to a motor vehicle for diagnosing an exhaust gas catalytic converter (28), which is arranged in an exhaust gas tract (20) of an internal combustion engine (12) and is suitable for converting at least one exhaust gas component, wherein the exhaust gas tract (20) has an exhaust gas sensor (48) arranged upstream of the exhaust gas catalytic converter (28) and has an exhaust gas recirculation system (38), which is designed to remove at least part of the exhaust gas from an exhaust gas duct (24) of the exhaust gas tract (20) downstream of the exhaust gas catalytic converter (28) and to feed the removed exhaust gas to the internal combustion engine (12). The method comprises the following steps: measuring a first concentration (NOX1) of the exhaust gas component upstream of the
(Continued)

exhaust gas catalytic converter (28) by means of the exhaust gas sensor (48) during fueled operation of the internal combustion engine (12), recirculating at least part of the exhaust gas by means of the exhaust gas recirculation system (38) during unfueled overrun of the internal combustion engine (12), measuring a second concentration (NOX2) of the exhaust gas component by means of the exhaust gas sensor (48) during the unfueled overrun of the internal combustion engine (12), and determining a state of the exhaust gas catalytic converter (28) in dependence on the first and second concentrations (NOX1, NOX2) of the exhaust gas component.

10 Claims, 2 Drawing Sheets

(51) Int. Cl.
| | | |
|---|---|---|
| *F01N 11/00* | (2006.01) | |
| *F02D 41/12* | (2006.01) | |
| *F02D 41/14* | (2006.01) | |
| *F01N 3/20* | (2006.01) | |
| *F02M 26/15* | (2016.01) | |

(52) U.S. Cl.
CPC .......... *F01N 11/007* (2013.01); *F02D 41/123* (2013.01); *F02D 41/1461* (2013.01); *F02M 26/15* (2016.02); *F01N 2430/00* (2013.01); *F01N 2550/02* (2013.01); *F01N 2560/026* (2013.01); *F01N 2610/02* (2013.01); *F01N 2900/1402* (2013.01); *F01N 2900/1621* (2013.01); *Y02T 10/24* (2013.01); *Y02T 10/47* (2013.01)

(56) References Cited

U.S. PATENT DOCUMENTS

| | | |
|---|---|---|
| 2005/0274369 A1 | 12/2005 | Tonetti et al. |
| 2007/0068140 A1 | 3/2007 | Lamb |
| 2011/0094482 A1 | 4/2011 | Weber et al. |
| 2013/0269327 A1 | 10/2013 | Keppeler |
| 2015/0040540 A1 | 2/2015 | Hülser et al. |
| 2015/0315951 A1 | 11/2015 | Veldten et al. |

FOREIGN PATENT DOCUMENTS

| | | |
|---|---|---|
| CN | 103670727 A | 3/2014 |
| DE | 102 54 477 B3 | 6/2004 |
| DE | 103 49 126 A1 | 6/2004 |
| DE | 10 2006 028 287 A1 | 3/2007 |
| DE | 10 2010 042 442 A1 | 5/2011 |
| DE | 10 2010 050 413 A1 | 5/2012 |
| DE | 10 2012 025 022 A1 | 6/2014 |
| JP | H06- 265 498 A | 9/1994 |
| WO | WO 2004/046528 A1 | 6/2004 |
| WO | WO 2013/139848 A1 | 9/2013 |
| WO | WO 2014/095215 A1 | 6/2014 |

OTHER PUBLICATIONS

Search Report for German Patent Application No. 10 2014 201 000.4, dated Aug. 25, 2014.
International Search Report for PCT International Application No. PCT/EP2014/079390, dated Jul. 29, 2015.

METHOD FOR DIAGNOSING AN EXHAUST GAS CATALYTIC CONVERTER, AND MOTOR VEHICLE

CROSS-REFERENCE TO RELATED APPLICATIONS

This application is a National Phase Application of PCT International Application No. PCT/EP2014/079390, International Filing Date Dec. 29, 2014, claiming priority of German Patent Application No. 10 2014 201 000.4, filed Jan. 21, 2014, which is hereby incorporated by reference in its entirety.

FIELD OF THE INVENTION

The invention relates to a method for diagnosing an exhaust gas catalytic converter, especially an SCR catalytic converter, that is arranged in an exhaust gas pipe of the internal combustion engine of a motor vehicle and that is suitable for the conversion of at least one exhaust gas component. The invention also relates to a motor vehicle that is equipped to carry out said method.

BACKGROUND OF THE INVENTION

Internal combustion engines that are operated either constantly or at times with a lean air-fuel mixture produce nitrogen oxides $NO_x$ (mainly $NO_2$ and NO), which require $NO_x$-reducing measures. Exhaust gas recirculation (EGR) is an engine-related measure aimed at reducing $NO_x$ raw emissions in the exhaust gas, and this is a process in which part of the exhaust gas of the internal combustion engine is recirculated into its combustion air. As a result, the combustion temperatures are lowered, and consequently, the formation of $NO_x$ ($NO_x$ raw emissions) is reduced. As a rule, however, exhaust gas recirculation alone is not sufficient to comply with statutory $NO_x$ limit values, which is why there is an additional need for an active exhaust gas after-treatment that lowers the $NO_x$ final emissions by catalytically reducing $NO_x$ to form nitrogen $N_2$. A known $NO_x$ exhaust gas after-treatment involves the use of $NO_x$ storage catalysts. During lean operation ($\lambda>1$), these catalysts store nitrogen oxides in the form of nitrates. During short rich intervals ($\lambda<1$), the stored nitrogen oxides are once again desorbed and reduced to nitrogen $N_2$ in the presence of the reductants present in the rich exhaust gas.

Another approach for converting nitrogen oxides in the exhaust gases of lean-burning internal combustion engines is the use of catalyst systems that operate according to the principle of selective catalytic reduction (SCR). These systems comprise at least one SCR catalytic converter that, in the presence of a reductant metered into the exhaust gas— normally ammonia $NH_3$—selectively convert the nitrogen oxides of the lean exhaust gas into nitrogen and water. In this context, the ammonia can be metered into the exhaust gas stream from an aqueous solution of ammonia. Normally, however, it is obtained from a precursor compound, for instance, urea in the form of an aqueous solution or solid pellets, through the modality of thermolysis and hydrolysis.

It likewise a known procedure to continuously check the proper functioning of exhaust gas catalytic converters such as, for example, SCR catalytic converters or $NO_x$-storage catalytic converters by means of on-board diagnostics (OBD). Towards this end, the signal from an exhaust gas sensor located downstream from the catalytic converter is normally employed for the appertaining exhaust gas component in order to measure the concentration of this exhaust gas component downstream from the exhaust gas catalytic converter. Furthermore, the concentration of the exhaust gas component is determined upstream from the catalytic converter, that is to say, the raw emissions from the engine. This can be done by measuring the concentration by means of another exhaust gas sensor installed upstream from the catalytic converter. However, the raw emissions are more often ascertained by means of modeling using stored characteristic maps that depict the concentration of the component as a function of a momentary operating point of the internal combustion engine. The status of the exhaust gas catalytic converter in terms of its conversion of the component is a function of the concentration measured downstream from the catalytic converter and of the measured or modeled concentration upstream from the catalytic converter, that is to say, the raw emissions of the internal combustion engine. The status of the exhaust gas catalytic converter can be calculated, for example, in the form of the efficiency $\eta$ in accordance with the equation below, wherein c2 is the concentration (or the content) of the exhaust gas component measured downstream from the catalytic converter and c1 stands for the raw emissions of this component by the internal combustion engine:

$$\eta = 1 - \frac{c2}{c1}$$

The efficiency $\eta$ can thus assume values from 0 to 1. An ideally functioning catalytic converter that brings about a complete catalytic conversion (c2=0) thus exhibits an efficiency $\eta$ of 1, whereas $\eta=0$ (c1=c2) in the case of a completely inactive catalytic converter.

German patent application DE 10 2010 042 442 A1 describes an exhaust gas system with an SCR catalytic converter as well as with a low-pressure (LP) exhaust gas recirculation system by means of which a partial stream of exhaust gas is withdrawn downstream from a turbine (on the low-pressure side) of an exhaust gas turbocharger and downstream from the SCR catalytic converter, while the combustion air of the internal combustion engine is fed in upstream from a compressor (on the low-pressure side) of the exhaust gas turbocharger. In the exhaust gas recirculation line, there is an $NO_x$ sensor that measures the concentration of nitrogen oxides in order to regulate the internal combustion engine on the basis of the $NO_x$ concentration thus ascertained, especially the exhaust gas recirculation (EGR) rate or the air-fuel ratio. The exhaust gas recirculation line is also connected to the air line of the internal combustion engine via a bypass that opens up into the air line downstream from the compressor, in other words, on its high-pressure side. In order to determine an offset of the $NO_x$ sensor so that it can be calibrated, the bypass is opened, which brings about a reversal in the direction of flow in the exhaust gas recirculation line, so that the $NO_x$ sensor is charged with fresh air. A diagnose of the SCR catalytic converter is not described here.

German patent application DE 10 2010 050 413 A1 discloses an exhaust gas system of an internal combustion engine that has an oxidation catalytic converter, a particulate filter as well as an SCR catalytic converter, whereby optionally, the particulate filter can have an SCR catalytic coating, and a separate SCR catalytic converter can be dispensed with. Moreover, the internal combustion engine has a double charge with a combination of high-pressure (HP) and low-pressure (LP) exhaust gas recirculation (EGR) in which the low-pressure EGR line branches off downstream from the particulate filter and it accommodates an additional SCR catalytic converter.

German patent application DE 103 49 126 A1 describes the above-mentioned approach for ascertaining the efficiency of an SCR catalytic converter, either by means of an $NO_x$ sensor upstream as well as downstream from the catalytic converter or else, instead of the upstream sensor, by means of a mathematical model for the $NO_x$ raw emissions. If the calculated $NO_x$ efficiency of the SCR catalytic converter falls below a prescribed basic efficiency, the catalytic converter is regenerated, eliminating the deposited hydrocarbons and soot.

Both of the above-mentioned approaches for diagnosing an exhaust gas catalytic converter entail drawbacks. The arrangement of an exhaust gas sensor upstream as well as downstream from the catalytic converter constitutes a costly measure involving additional equipment. If, in contrast, the upstream exhaust gas sensor is replaced by a mathematical model for ascertaining the raw emissions of the pertinent exhaust gas component, the diagnostic robustness can be detrimentally affected due to unavoidable imprecision or unreliability of the mathematical model employed. Moreover, the use of such a model is associated with extra costs.

SUMMARY OF THE INVENTION

The invention is based on the objective of putting forward a method for diagnosing an exhaust gas catalytic converter which exhibits a high degree of diagnostic robustness and, at the same time, only entails low costs.

This objective is achieved by a method as well as by a motor vehicle having the features of the independent claims. Preferred embodiments of the invention are the subject matter of the dependent claims.

The method according to the invention relates to the diagnosis of an exhaust gas catalytic converter that is arranged in the exhaust gas tract of the internal combustion engine of a motor vehicle and that is suitable for the conversion of at least one exhaust gas component. In this context, there is an exhaust gas sensor installed in the exhaust gas tract upstream from the exhaust gas catalytic converter. Moreover, the exhaust gas tract has an exhaust gas recirculation system that is designed so that at least some of the exhaust gas can be removed from an exhaust gas pipe of the exhaust gas tract downstream from the exhaust gas catalytic converter and can be fed to the internal combustion engine, more concretely, into its combustion air. The method according to the invention comprises the following steps:

measuring a first concentration of the exhaust gas component upstream from the exhaust gas catalytic converter by means of the exhaust gas sensor during operation of the internal combustion engine with the throttle open;

recirculating at least some the exhaust gas via the exhaust gas recirculation system during the overrun mode of operation of the internal combustion engine with the throttle closed;

measuring a second concentration of the exhaust gas component by means of the exhaust gas sensor during the overrun mode of operation of the internal combustion engine with the throttle closed; and determining the status of the exhaust gas catalytic converter as a function of the first and second concentrations of the exhaust gas component.

By means of the approach according to the invention, just one single exhaust gas sensor situated upstream from the exhaust gas catalytic converter that is to be monitored suffices to measure not only the concentration of the exhaust gas component upstream from the catalytic converter, that is to say, the raw emissions of the internal combustion engine, but also the concentration of this exhaust gas component after it has passed through the catalytic converter. For the latter purpose, the exhaust gas that is leaving the catalytic converter is recirculated to the internal combustion engine via the EGR system and operation of the internal combustion engine in the overrun mode with the throttle closed is utilized so that the exhaust gas composition is only affected to the smallest extent possible. Thanks to the use of one single exhaust gas sensor, extra costs can be avoided for the arrangement of a second exhaust gas sensor downstream from the catalytic converter as is normally done in the state of the art. Moreover, the use of one single sensor compensates for the deviations that might occur between the two sensors. Furthermore, since the method does not employ a mathematical model to ascertain the engine-related raw emissions of the exhaust gas component, uncertainties stemming from inaccuracies of such a model are eliminated. Consequently, the method according to the invention is very reliable.

Within the scope of the present invention, the expression "concentration of the exhaust gas component" refers to any quantity which indicates the content of exhaust gas with respect to this component. Therefore, it also encompasses the signal of the exhaust gas sensor, for instance, a sensor voltage or the like. The expression "operation with the throttle open" encompasses an operating mode in which the internal combustion engine is being operated with fuel feed and combustion. In contrast, the expression "operation with the throttle closed" encompasses an operating mode in which no fuel is being fed to the internal combustion engine. Such a switch-off of the fuel feed is undertaken especially during an overrun phase of the motor vehicle, in which the momentary kinetic energy of the vehicle is greater than the torque needed, that is to say, when the internal combustion engine is being turned over by the vehicle, in other words, it continues to rotate (overrun mode of operation).

In a preferred embodiment of the invention, the exhaust gas component comprises nitrogen oxides $NO_x$, including all oxides of nitrogen, especially, NO, $NO_2$ and $N_2O$. In this case, the exhaust gas catalytic converter is an $NO_x$ catalytic converter that is capable of converting nitrogen oxides contained in the exhaust gas into a rich exhaust gas atmosphere, that is to say, in the presence of reductants in the exhaust gas such as unburned hydrocarbons HC and carbon monoxide CO, or else it is an SCR catalytic converter that selectively converts nitrogen oxides into a lean exhaust gas atmosphere in the presence of a reductant that has been fed in. In this context, the term "reductant" especially refers to ammonia $NH_3$, which is fed into the exhaust gas either directly or else in the form of a precursor substance, especially in the form of urea, either as a solid or dissolved. The exhaust gas sensor in this embodiment is an $NO_x$ sensor that is configured to detect nitrogen oxides in the exhaust gas. In such an SCR catalytic converter system, the invention entails special advantages since the metering of reductant into the exhaust gas upstream from the catalytic converter has to be harmonized with the catalytic converter status to a particular degree. Otherwise, metering in too much or too little reductant would lead to undesired interruptions of the reductant downstream from the catalytic converter or else to an insufficient $NO_x$ conversion. Moreover the method can also be used to ascertain the quality of the reductant, for example, the concentration of urea in an aqueous urea solution, so that the metering can be adapted to it.

Preferably, the first concentration of the exhaust gas component is measured after an overrun phase of the vehicle has been ascertained, before the start of the overrun mode of the internal combustion engine with the throttle closed, especially immediately before the start of the overrun mode with the throttle closed. This makes it possible for the same exhaust gas volume in which the first concentration of the exhaust gas component has already been measured to also be employed for the second concentration measured during the overrun mode of operation with the throttle closed. The precision of the method is further improved in this manner.

The second concentration of the exhaust gas component is preferably measured during the overrun mode of operation of the internal combustion engine with the throttle closed, after a prescribed waiting time has passed. This ensures that the EGR line is adequately flushed, thereby removing any exhaust gas with a different composition that might be present in the EGR line. The waiting time is preferably prescribed so as to correspond at least to the circulation time of the exhaust gas since the measurement of the first concentration of the exhaust gas component. This makes it possible for the exhaust gas—after it has passed the exhaust gas sensor during the first concentration measurement—to have enough time to run through the exhaust gas recirculation line and the internal combustion engine, before it once again reaches the measuring site of the exhaust gas sensor. In other words, the distance between the first and second measurements of the concentration preferably corresponds essentially to the amount of time needed by the exhaust gas to completely circulate from the exhaust gas sensor through the exhaust gas catalytic converter, the EGR line and the internal combustion engine before it once again reaches the exhaust gas sensor.

It is especially provided that, during the overrun mode of operation of the internal combustion engine with the throttle closed, all of the exhaust gas is recirculated via the exhaust gas recirculation system. This achieves that the recirculated exhaust gas once gain reaches the exhaust gas sensor within a short time and in unchanged form. In this manner, even very short overrun phases of the vehicle or very brief periods of operation of the internal combustion engine in the overrun mode can be utilized to diagnose the exhaust gas catalytic converter.

In a preferred embodiment of the invention, downstream from a branching site of the EGR line, the exhaust gas pipe has an exhaust gas blocking element which, in a closed position, is capable of reducing or completely closing the flow cross section of the exhaust gas pipe. The exhaust gas blocking element can be configured, for instance, as an exhaust gas flap, preferably a continuously adjustable exhaust gas flap. The exhaust gas is preferably recirculated via the exhaust gas recirculation system during the overrun mode of operation of the internal combustion engine with the throttle closed by closing the exhaust gas blocking element. In this manner, it is possible to bring about a largely complete and quick recirculation of the exhaust gas.

Another aspect of the present invention relates to a motor vehicle comprising the following:
an internal combustion engine;
an exhaust gas tract with an exhaust gas pipe, an exhaust gas catalytic converter that is arranged in the exhaust gas pipe and that is suitable for the conversion of at least one exhaust gas component, and an exhaust gas sensor that is arranged upstream from the exhaust gas catalytic converter and that serves to detect the exhaust gas component;
an exhaust gas recirculation system that is configured to remove at least some of the exhaust gas from the exhaust gas pipe downstream from the exhaust gas catalytic converter and to feed it to the internal combustion engine; and
a diagnostic device designed to carry out the method for diagnosing the exhaust gas catalytic converter.

In particular, the control unit has a computer-readable algorithm for carrying out the method. Optionally, it additionally comprises characteristic lines and/or characteristic maps that are needed, for example, a characteristic line of the exhaust gas sensor employed.

In a preferred embodiment, the motor vehicle also has an exhaust gas blocking element arranged downstream from the branching site of the EGR line, as was described above. The blocking element allows a largely complete and quick recirculation of the exhaust gas flow.

According to another embodiment, the motor vehicle also has an exhaust gas turbocharger with a turbine arranged in the exhaust gas pipe, whereby the exhaust gas recirculation system is configured as a low-pressure exhaust gas recirculation system, that is to say, the EGR line branches off from the exhaust gas pipe downstream from the turbine (on the low-pressure side).

Unless otherwise indicated in individual cases, the various embodiments of the invention cited in this application can be advantageously combined with each other.

BRIEF DESCRIPTION OF THE DRAWINGS

The invention will be explained in greater detail below on the basis of embodiments making reference to the accompanying drawings. The following is shown.

DETAILED DESCRIPTION OF THE INVENTION

The invention will be presented below on the basis of an example of the diagnosis of an SCR catalytic converter. However, it goes without saying that the invention can also be employed for other exhaust gas catalytic converters.

Figure 1:
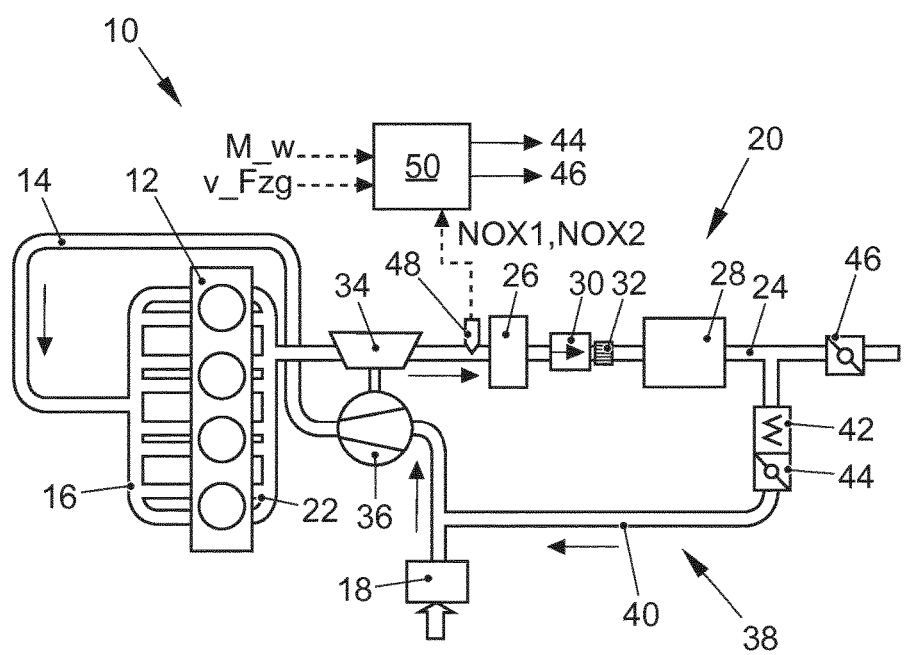
FIG. 1 a schematic view of an exhaust gas system of a motor vehicle according to an advantageous embodiment of the invention.

FIG. 1 shows a motor vehicle which is designated in its entirety by the reference numeral 10 and which is driven by an internal combustion engine 12 that is lean-running, at least at times, especially by a diesel engine that serves as the source of traction. The internal combustion engine 12 has, for instance, four cylinders here, whereby any number of cylinders diverging from this is likewise possible.

The internal combustion engine 12 is supplied with combustion air via an air line 14 as well as via an air manifold 16 that conveys the drawn-in air to the cylinders. The combustion air drawn in from the ambient air is cleaned of particulate constituents by means of an air filter 18.

The motor vehicle 10 also has an exhaust gas tract which is designated in its entirety by the reference numeral 20 and which serves for the catalytic after-treatment of exhaust gas from the internal combustion engine 12. The exhaust gas tract 20 comprises an exhaust gas manifold 22 that connects the individual outlets of the cylinders of the internal combustion engine 12 to a shared exhaust gas pipe 24. The exhaust gas pipe 24 ends into an exhaust tailpipe (shown on the right in the drawing) and it holds several components for the after-treatment of the exhaust gas.

In the example shown, the exhaust gas first reaches an oxidation catalytic converter 26. This catalytic converter has a catalyst substrate that is coated with a catalytic coating that catalyzes the oxidation of exhaust gas components. In particular, it is well-suited for converting unburned hydrocarbons HC and carbon monoxide CO into $CO_2$ and $H_2O$. Moreover, the catalytic coating of the oxidation catalytic converter 26 is configured to oxidize NO and $N_2O$ to form $NO_2$ in order to increase the ratio of $NO_2$ to NO. The catalytic coating of the oxidation catalytic converter 26 contains as the catalytic component particularly at least one element from the group of platinum metals Pt, Pd, Rh, Ru, Os or Ir, or else a combination thereof, especially Pt and/or Pd. The catalytic coating also contains a washcoat comprising a porous ceramic matrix having a large specific surface area, for example, on the basis of zeolite, which is doped with the catalytic component. The substrate of the oxidation catalytic converter 26 can be a metallic substrate or a ceramic monolith, especially a honeycomb-like structure having a plurality of continuous, parallel flow channels. Suitable ceramic materials include aluminum oxide, cordierite, mullite and silicon carbide. Suitable material substrates are made out of stainless steel or iron-chromium alloys.

Downstream from the oxidation catalytic converter 26, there is another exhaust gas catalytic converter, here an SCR catalytic converter 28, in the exhaust gas pipe 24. The SCR catalytic converter 28, like the oxidation catalytic converter 26, comprises a catalyst substrate on a metallic or ceramic basis, preferably on a ceramic basis. Suitable ceramic or metallic materials correspond to those mentioned in conjunction with the oxidation catalytic converter. The inner walls of the parallel and continuous flow channels of the substrate are coated with an SCR catalytic coating that brings about the reduction of nitrogen oxides to form nitrogen under selective consumption of a reductant. The coating, in turn, comprises a washcoat consisting of a porous ceramic matrix having a large specific surface area (e.g. a zeolite on an aluminum silicate basis), with catalytic substances distributed thereupon. Suitable SCR catalytic substances encompass especially non-noble metals such as Fe, Cu, Va, Cr, Mo, W as well as combinations thereof. These substances are deposited onto the zeolite and/or the zeolite metals are partially replaced by the corresponding non-noble metals through the modality of ion exchange.

The exhaust gas tract 20 also has a reductant metering unit 30 with which the reductant or a precursor compound thereof is metered into the exhaust gas. For instance, the reductant is introduced into the exhaust gas stream by means of a nozzle located upstream from the SCR catalytic converter 28. The reductant can typically be ammonia $NH_3$ that is metered in in the form of a precursor compound, especially in the form of urea. Preferably, the urea in the form of an aqueous solution is conveyed and metered in from a reservoir (not shown here). In a mixer 32 installed downstream from the metering unit 30, the urea is mixed with the hot exhaust gas and decomposed to form $NH_3$ and $CO_2$ through the modality of thermolysis and hydrolysis. The $NH_3$ is stored in the coating of the SCR catalytic converter 28, where it is used for the reduction of nitrogen oxides in the exhaust gas. The reductant is usually metered in via the metering unit 30 by means of a control system (not shown here) which regulates the metering unit 30 as a function of a given operating point of the engine 12, especially as a function of the momentary $NO_x$ concentration in the exhaust gas.

It goes without saying that the exhaust gas tract 20 can have exhaust gas after-treatment components that differ from those shown in FIG. 1 or that are in addition to those, especially a particulate filter to remove particulate exhaust gas components.

The vehicle 10 also comprises an exhaust gas turbocharger that has a turbine 34 arranged in the exhaust gas pipe 24, said turbine being joined, for example, by means of a shaft to a compressor 36 situated in the air line 14. The turbine 34 withdraws kinetic energy from the exhaust gas in order to drive the compressor 36 and in order to compress the drawn-in combustion air. Normally, downstream from the compressor 36, there is an intercooler (not shown here) by means of which heat that was generated by the compression is withdrawn from the combustion air.

The motor vehicle 10 also has a low-pressure exhaust gas recirculation system (LP-EGR) 38. It has an exhaust gas recirculation line 40 that, on the low-pressure side of the turbine 34 downstream from the SCR catalytic converter 28, withdraws a partial stream or a complete stream of the exhaust gas from the exhaust gas pipe 24 and feeds it into the air line 14 on the low-pressure side of the compressor 36. An EGR cooler 42 situated in the EGR line 40 cools the hot, recirculated exhaust gas. The EGR rate, that is to say, the recirculated portion of exhaust gas in the combustion air of the internal combustion engine 12, is regulated by means of an EGR valve 44 likewise situated in the EGR line 40. Normally, the EGR valve 44 is regulated as a function of a given operating point of the internal combustion engine 12, whereby the valve 44 can be continuously varied between a completely closed position (EGR rates of zero, complete deactivation of the EGR) and a completely open position.

Downstream from the branching site of the EGR line 40 from the exhaust gas pipe 24, there is an exhaust gas blocking element 46 that can be adjusted, preferably continuously, between an open and a closed position. The exhaust gas blocking element 46 can be configured, for instance, as an exhaust gas flap. In its closed position, the exhaust gas blocking element 46 blocks the exhaust gas line 24 essentially completely.

Like all exhaust gas catalytic converters, the SCR catalytic converter 28 is also prone to an age-related deterioration of its catalytic activity. For this reason, there is a need for an ongoing diagnosis of the SCR catalytic converter 28 in order to detect an unacceptable reduction of its catalytic activity and in order to ensure a precise metering of the reductant. According to the invention, the SCR catalytic converter 28 is diagnosed by means of an $NO_x$ sensor 48 situated upstream from it. Preferably, the sensor 48 is installed upstream from the reductant metering unit 30 and especially preferably upstream from the oxidation catalytic converter 26. Since the $NO_x$ sensor 48 is arranged very close to the engine 12, it can quickly reach operational readiness after a cold start of the engine 12. An output signal NOX1, NOX2 of the $NO_x$ sensor 48 is entered as an input quantity into a diagnostic device 50. Moreover, the diagnostic device 50 can receive information about the momentary operating point of the vehicle 10 and of the internal combustion engine 12, especially the vehicle speed v_Fzg and a desired torque M_w requested by the driver by actuating the gas pedal. As a function of these and, if applicable, other quantities, the diagnostics device 50 performs a diagnosis of the SCR catalytic converter 28 by means of the method according to the invention. For this purpose, the diagnostics device emits control signals (indicated by solid arrows in FIG. 1), by means of which the EGR valve 44, the exhaust gas flap 46 and the fuel feed to the internal combustion engine 12 can all be actuated.

Figure 2:
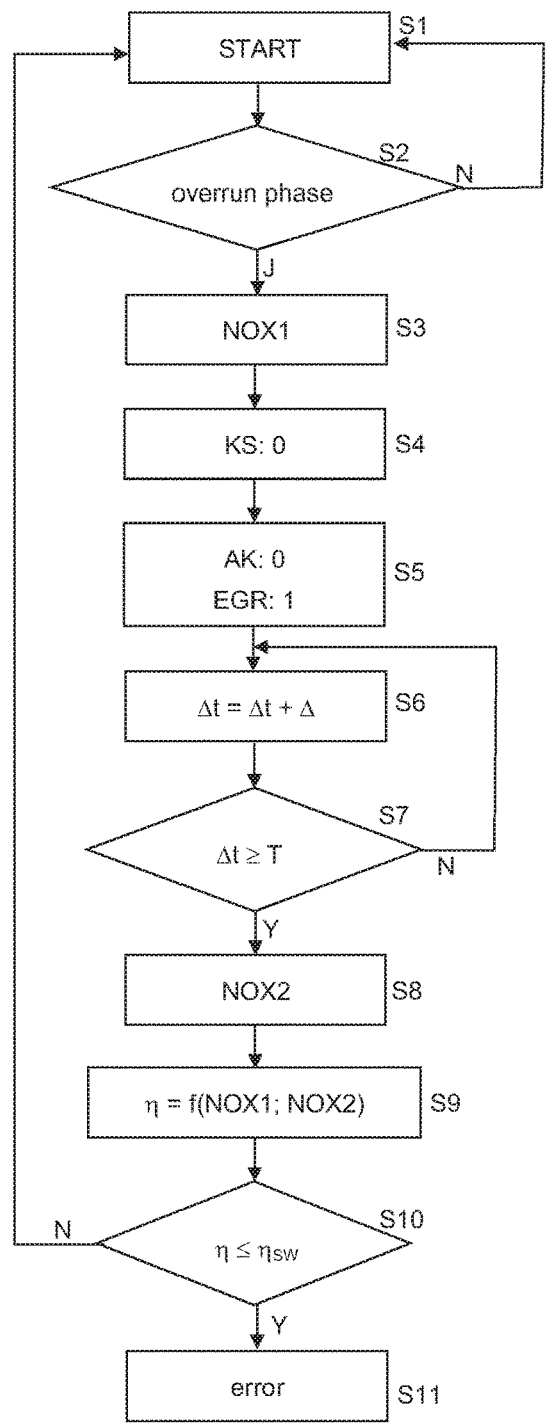
FIG. 2 a flow chart for carrying out a diagnosis of an SCR catalytic converter according to an advantageous embodiment of the invention.

A preferred sequence of the method according to the invention for diagnosing the SCR catalytic converter 28 will be explained in greater detail below making reference to FIG. 2.

The method starts in step S1 and then proceeds to the step S2, in which the operating point of the vehicle 10 is checked as to whether an overrun phase is present, that is to say, whether the momentary kinetic energy of the vehicle is greater than the torque M_w currently being requested by the driver. For purposes of ascertaining the presence of an overrun phase of the vehicle, the diagnostics unit 50 can evaluate, for instance, the torque M_w being requested by the driver as well as the momentary vehicle speed V_Fzg. As an alternative, the diagnostics unit 50 can also directly receive an appertaining overrun phase signal from a general engine control unit. If the query S2 did not ascertain an overrun phase of the vehicle 10, the method is interrupted and returns to step S1.

If, on the other hand, an overrun phase of the vehicle is detected, the method proceeds to step S3, in which a first concentration of nitrogen oxides NOX1 in the exhaust gas is measured by means of the $NO_x$ sensor 48. Therefore, the first $NO_x$ concentration NOX1 corresponds to the $NO_x$ raw emissions of the internal combustion engine 12 during operation with the throttle open, said $NO_x$ raw emissions being present at the inlet of the SCR catalytic converter 28.

Then the method proceeds to step S4, in which the fuel feed to the internal combustion engine 12 is switched off, that is to say, the fuel volume KS that is to be injected is set to zero. At the same time, a throttle valve (not shown in FIG. 1) in the air line 14 of the internal combustion engine 12 remains open.

In the subsequent step S5, the exhaust gas recirculation via the LP exhaust gas recirculation system 38 is initiated. Towards this end, the exhaust gas flap (AK) 46 is closed and the EGR valve 44 of the EGR line 40 is opened to its maximum. The exhaust gas recirculated via the EGR line 40 is conveyed by the internal combustion engine 10 that is being turned over by the vehicle 10 in the overrun phase.

The subsequent steps S6 and S7 correspond to a timer function. For this purpose, a time meter Δt is raised by a prescribed increment A in step S6. In the query S7 that follows, it is checked whether the time meter Δt has reached a prescribed waiting time T. In this context, the prescribed waiting time T is predefined in such a way that it corresponds at least to the exhaust gas circulation time that the exhaust gas needs from the moment when the first $NO_x$ concentration NOX1 is measured in step S3 until it has once again reached the $NO_x$ sensor 48. As along as the time meter Δt is smaller than the waiting time T, in other words, as long as the response to the query in S7 is "no", the method returns to step S6 in order for the time meter Δt to count up once again.

Once the time meter Δt has reached the waiting time T, in other words, once the response to the query in S7 is "yes", the method proceeds to step S8, in which the $NO_x$ concentration of the exhaust gas is measured once again with the $NO_x$ sensor 48. Owing to the preceding waiting loop in the form of steps S6 and S7, it is ensured that the concentration measurement made by the sensor 48 at the point in time of the measurement in step S8 is carried out in an exhaust gas that has already passed through the SCR catalytic converter 28. Ideally, the measurement in step S8 is carried out in the same exhaust gas volume that also served as the basis for the first concentration measurement in step S3. Therefore, the $NO_x$ concentration NOX2 measured in step S8 corresponds to the concentration present downstream from the SCR catalytic converter 28.

In step S9, the status of the SCR catalytic converter 28 is ascertained as a function of the first $NO_x$ concentration NOX1 and second $NO_x$ concentration NOX2 measured in steps S3 and S8. For example, the status of the catalytic converter in the form of its efficiency η can be ascertained in accordance with the following equation:

$$\eta = 1 - \frac{NOX2}{NOX1}$$

When it comes to an ideally intact SCR system, the $NO_x$ concentration NOX2 during the overrun phase is close to zero and the efficiency η is close to 1. In a completely inactive SCR system, in contrast, the NOX2 is at the level of the $NO_x$ raw emissions NOX1. In this case, the efficiency η is close to zero.

In the subsequent query in step S10, a comparison is made between the ascertained status η of the catalytic converter and a suitable threshold value $\eta_{SW}$. In the case of a damaged SCR catalytic converter 28, the query S10 ascertains whether the efficiency has fallen below the threshold and, in step S11, an error signal is output. In contrast, if the ascertained efficiency is greater than the prescribed threshold, the SCR system is working satisfactorily and the method returns to its starting point.

LIST OF REFERENCE NUMERALS 10 motor vehicle
12 internal combustion engine
14 air line
16 air manifold
18 air filter
20 exhaust gas tract
22 exhaust gas manifold
24 exhaust gas pipe
26 oxidation catalytic converter
28 exhaust gas catalytic converter/SCR catalytic converter
30 reductant metering unit
32 mixer
34 turbine
36 compressor
38 low-pressure exhaust gas recirculation system
40 exhaust gas recirculation line
42 EGR cooler
44 EGR valve
46 exhaust gas blocking element
48 $NO_x$ sensor
50 diagnostic device
NOX1 first concentration of the exhaust gas component during operation when the throttle is open
NOX2 second concentration of the exhaust gas component during operation when the throttle is closed
M_w requested driving torque
V_Fzg vehicle speed
η catalytic converter status/catalytic converter efficiency
$\eta_{SW}$ threshold value
Δt time meter
Δ time increment

The invention claimed is:

1. A method for diagnosing an exhaust gas catalytic converter (28) that is arranged in the exhaust gas tract (20) of the internal combustion engine (12) of a motor vehicle (10) and that is suitable for the conversion of at least one exhaust gas component, whereby an exhaust gas sensor (48) is installed in the exhaust gas tract (20) upstream from the exhaust gas catalytic converter (28), the motor vehicle (10) having an exhaust gas recirculation system (38) that is designed so that at least some exhaust gas can be removed from an exhaust gas pipe (24) of the exhaust gas tract (20) downstream from the exhaust gas catalytic converter (28) and can be fed to the internal combustion engine (12), comprising the following steps:
  measuring a first concentration (NOX1) of the at least one exhaust gas component upstream from the exhaust gas catalytic converter (28) by means of the exhaust gas sensor (48) during operation of the internal combustion engine (12) with the throttle open;
  recirculating at least some exhaust gas via the exhaust gas recirculation system (38) during an overrun mode of operation of the internal combustion engine (12) with the throttle closed;
  measuring a second concentration (NOX2) of the exhaust gas component by means of the exhaust gas sensor (48) during the overrun mode of operation of the internal combustion engine (12) with the throttle closed; and
  determining the status of the exhaust gas catalytic converter (28) as a function of the first and second concentrations (NOX1, NOX2) of the at least one exhaust gas component.

2. The method according to claim 1, wherein the at least one exhaust gas component comprises nitrogen oxides (NOx), and the exhaust gas catalytic converter (28) is an NOx catalytic converter or an SCR catalytic converter, and the exhaust gas sensor (48) is an NOx sensor.

3. The method according to claim 1, wherein the first concentration (NOX1) of the at least one exhaust gas component is measured after an overrun phase of the vehicle (10) has been ascertained, before the start of the overrun mode of the internal combustion engine (12) with the throttle closed.

4. The method according to claim 1, wherein the second concentration (NOX2) of the at least one exhaust gas component is measured during the overrun mode of operation of the internal combustion engine (12) with the throttle closed, after a prescribed waiting time (T) has passed.

5. The method according to claim 1, wherein the waiting time (T) is prescribed so as to correspond at least to a circulation time of the exhaust gas since the measurement of the first concentration (NOX1) of the at least one exhaust gas component.

6. The method according to claim 1, wherein, during the overrun mode of operation of the internal combustion engine (12) with the throttle closed, all of the exhaust gas is recirculated via the exhaust gas recirculation system (38).

7. The method according to claim 1, wherein the exhaust gas is recirculated via the exhaust gas recirculation system (38) by closing an exhaust gas blocking element (46) arranged downstream from a branching site of an exhaust gas recirculation line (40) of the exhaust gas recirculation system (38).

8. A motor vehicle (10), comprising:
  an internal combustion engine (12);
  an exhaust gas tract (20) with an exhaust gas pipe (24), an exhaust gas catalytic converter (28) that is arranged in the exhaust gas pipe (24) and that is suitable for the conversion of at least one exhaust gas component, and an exhaust gas sensor (48) that is arranged upstream from the exhaust gas catalytic converter (28) and that serves to detect the at least one exhaust gas component;
  an exhaust gas recirculation system (38) that is configured to remove at least some exhaust gas from the exhaust gas pipe (24) downstream from the exhaust gas catalytic converter (28) and to feed it to the internal combustion engine (12); and
  a diagnostic device (50) designed to carry out the method for diagnosing the exhaust gas catalytic converter (28) by:
  measuring a first concentration (NOX1) of the at least one exhaust gas component upstream from the exhaust gas catalytic converter (28) by means of the exhaust gas sensor (48) during operation of the internal combustion engine (12) with the throttle open;
  recirculating the at least some exhaust gas via the exhaust gas recirculation system (38) during an overrun mode of operation of the internal combustion engine (12) with the throttle closed;
  measuring a second concentration (NOX2) of the at least one exhaust gas component by means of the exhaust gas sensor (48) during the overrun mode of operation of the internal combustion engine (12) with the throttle closed; and
  determining the status of the exhaust gas catalytic converter (28) as a function of the first and second concentrations (NOX1, NOX2) of the at least one exhaust gas component.

9. A motor vehicle according to claim 8, also comprising an exhaust gas blocking element (46) arranged downstream from the branching site of an exhaust gas recirculation line (40) of the exhaust gas recirculation system (38).

10. The motor vehicle according to claim 8, also comprising an exhaust gas turbocharger (34, 36) with a turbine (34) arranged in the exhaust gas pipe (24), whereby the exhaust gas recirculation system (38) is configured as a low-pressure exhaust gas recirculation system.

* * * * *